Patented Sept. 8, 1942

2,294,931

UNITED STATES PATENT OFFICE 2,294,931

VITREOUS ENAMEL CONTAINING ZIRCONIUM AND PROCESS FOR PREPARING SAME

Maxime Pâquet, Saint-Maure-des-Fosses, France

No Drawing. Application May 26, 1939,
Serial No. 276,022

9 Claims. (Cl. 106—48)

It is broadly known to use zirconium compounds, in particular zirconia or zirconium oxide and zircon or zirconium silicate for the opacification of the enamels, but in the case of enamels baked at high temperature for a fairly long time, such as ceramic enamels, entirely or practically entirely unsatisfactory results are obtained, since these products are almost completely dissolved, under such conditions, without producing any substantial opacity. The results are equally bad whether the zirconium compounds be added during the fusion of the frit or during the grinding of the enamels.

The research work carried out by the inventor has however enabled him to prove that it is possible to use zirconium compounds as opacifying agents for enamels for such purposes, when certain conditions are fulfilled, and that under these conditions the zirconium compounds can give results which are comparable to those obtained with the best tin compounds.

The invention consists in adding the zirconium compound used as an opacifying agent, during the grinding at the mill, to a separately prepared frit which is both rich in $B_2O_3$, and in alumina and which is saturated with a zirconium compound, so that the zirconium compound which is subsequently added remains practically insoluble.

The zirconium compound which is added to the frit prepared according to the present invention may be zirconia $ZrO_2$, or a vitrified compound obtained from zircon, according to the pending patent application filed by Maxime Pâquet and Paul Ourisson entitled: "Opaquing agents mainly comprising zirconia and process for preparing same, Ser. No. 275,566 filed May 24, 1939.

For preparing a frit according to the present invention, several conditions are necessary and others are useful and to be given the preference.

It is necessary for the enamel, which is necessarily very siliceous in order to have an expansion coefficient similar to the one of the ceramic material, to be also rich in $Al_2O_3$ and $B_2O_3$.

This high alumina content is advantageously provided for by kaolin, clay or alumina. Part of it may be provided for by feldspar, but too high a proportion of feldspar produces enamels which tend to become dull on firing.

According to the inventor's research work, the alumina content of the frit should be between 4.5% and 10%. The silica content should be 40 to 55% and preferably about 50%. The $B_2O_3$ content should be between 8 and 12%.

It is necessary for the vitreous flux of the enamel to be saturated with a zirconium compound which renders practically insoluble the appropriate zirconium compound, which is subsequently added to produce the desired opacity. This saturation is advantageously obtained by adding zircon (ground zirconium silicate) to the enamel before fusing the frit, which zircon dissolves completely, without producing substantial opacity, thereby participating in the formation of the vitreous compound which will form the required basis of the enamel. According to the inventor's research work, the zirconium oxide content of the frit should be about between 8 and 10%.

If the zirconium content of the frit is too high, the appearance of a zircon spectrum is observed by means of X-rays; a quantity of zircon corresponding to 8 to 10% of $ZrO_2$ corresponds to the best possible saturation. Below these figures for the same quantity of opacifying agents added at the grinding mill (6% of $ZrO_2$ for example) the opacity of the enamel quickly decreases, and on the contrary with higher proportions, no noticeable improvement is observed and the quality of the enamel becomes poorer.

In addition to the above necessary conditions, the inventor has found the following peculiarities to be useful:

(a) A certain ZnO content is advantageous: 5 to 7% appear to be sufficient, and care must be taken not to fall too far short of these figures which may however be increased, such increase not being detrimental if the formulae are balanced accordingly.

(b) Other divalent fluxes are added and particularly alkaline-earth fluxes—CaO—BaO—MgO; 2 to 3% of MgO would appear to be suitable. A higher CaO content is useful.

A part of these various fluxes—ZnO—CaO—BaO—MgO may be replaced by PbO, so as to obtain lead enamels which are advantageous in certain cases.

(c) Fluorides are not indispensable, but 3 to 4% of cryolite or sodium fluosilicate improve the shade of white obtained and favour the opacity, higher quantities on the contrary appear to be unfavourable.

(d) A nitrate added to the enamel is useful for maintaining an oxidizing medium during the fusion, barium nitrate would appear to be the most suitable. It avoids the introduction of unfavourable alkalies.

(e) A high alkali metal oxide content must be avoided, which would be detrimental to the opacity on the one hand and incompatible with the necessary expansion coefficient. The alkali metal oxide content is advantageously kept between 3 and 8 per cent.

The zirconium compound which is added as an opacifying agent to a frit of this type, should be of the appropriate kind. Thus zircon added in the proportion of 9% (i. e. about 6% of $ZrO_2$) only gives slight opacity which quickly decreases when the baking temperature rises or when the time of baking is prolonged. It would appear that in spite of the saturation of the enamel, with zirconium compounds, it is still partly dissolved.

According to the present invention, the zirconium compound is added in one of the following forms:

Either in the form of oxide $ZrO_2$ which is added to the frit in the grinding mill in a proportion of about 6%.

Or dispersed in a vitreous mass obtained for example by treating zircon with magnesia or with alumina, as described in the above mentioned co-pending patent application said zirconium compound being likewise added during grinding and under the same conditions and so as to supply the same quantity of $ZrO_2$.

In order to enable the present description to be understood more readily, various particular practical examples for carrying out the invention will be described hereinafter.

1st Example (Leadless enamel)

First of all prepare a frit having one of the following compositions, A or B:

|  | Frit A | Frit B |
| --- | --- | --- |
| Quartz | 310 | 350 |
| Kaolin | 185 | 100 |
| Chalk | 100 | 100 |
| Zinc oxide | 65 | 65 |
| Barium carbonate | 40 | 40 |
| Ordinary borax | 175 | 175 |
| Boric acid | 65 | 65 |
| Barium nitrate | 20 | 20 |
| Ground zircon ($ZrO_2$—65%) | 120 | 120 |

The composition of the frits thus obtained will in this case be as follows:

|  | A | B |
| --- | --- | --- |
| $SiO_2$ | 49.8 | 51.5 |
| $Al_2O_3$ | 8.3 | 4.7 |
| $B_2O_3$ | 11.4 | 11.9 |
| $ZrO_2$ | 9.1 | 9.5 |
| ZnO | 7.5 | 7.7 |
| CaO | 6.4 | 6.6 |
| BaO | 4.5 | 4.7 |
| $Na_2O$ | 3.2 | 3.3 |

These frits A and B are melted and run into water and the grains obtained are dried. Said grains are ground and during crushing, zirconium compounds such as above described, with or without other components, are added.

The following mixtures may for example be adopted:

(a) Enamel for ceramic ware baked at 950°/1000° C.:

| Melted A or B frit | 100 | all in- |
| Clay | 6 to 10 | gredients |
| Zr compound calculated as $ZrO_2$ | 5 to 8 | ground |

(b) Enamel for ceramic ware baked at 1050°/1080° C:

| Melted A or B frit | 100 | |
| Clay | 6 to 10 | |
| Quartz | 10 to 12 | all in- |
| Feldspar | 12 to 15 | gredients |
| Zinc oxide | 2 to 5 | ground |
| Zr compound calculated as $ZrO_2$ | 5 to 6 | |

2nd Example—Lead enamels

|  | Frit C | Frit D |
| --- | --- | --- |
| Quartz | 270 | 270 |
| Feldspar | 75 | 75 |
| Kaolin | 175 | 175 |
| Ordinary borax | 130 | 130 |
| Zinc oxide | 75 | 65 |
| Minium | 80 | 80 |
| Chalk | 80 | / |
| Magnesia | 15 | 15 |
| Barium carbonate | / | 30 |
| Barium nitrate | 30 | 30 |
| Sodium carbonate | 30 | 40 |
| Cryolite | / | 40 |
| Ground zircon ($ZrO_2$—65%) | 100 | 100 |

The composition of these frits are in this case:

|  | C | D |
| --- | --- | --- |
| $SiO_2$ | 48.4 | 48.5 |
| $B_2O_3$ | 5.2 | 5.3 |
| $Al_2O_3$ | 9.2 | 9.3 |
| $ZrO_2$ | 7.2 | 7.3 |
| ZnO | 8.2 | 7.2 |
| CaO | 4.9 | ---- |
| PbO | 8.5 | 8.6 |
| MgO | 1.6 | 1.6 |
| BaO | 1.6 | 3.8 |
| Alkalies | 5.1 | 7.4 |

The mixture is melted and run into water as in the previous cases; then the grains are dried.

These enamels are particularly intended for enamelling calcareous or feldspathetic ceramic wares at 960/980° C. but these formulae may also be modified in order to obtain harder enamels for ceramic wares of higher enamelling temperature.

The frit C is slightly harder than the frit D.

For grinding, the following mixtures may be adopted:

(a) Enamel for earthenware at 930° C.:

| Melted frit D | 100 | all |
| Clay | 6 to 10 | ingredients |
| Zr compound calculated as $ZrO_2$ | 5 to 8 | ground. |

(b) Enamel for earthenware at 1020° C.:

| Melted frit C | 100 | |
| Clay | 6 to 10 | all |
| Feldspar | 8 to 15 | ingredients |
| Zinc oxide | 2 to 5 | ground. |
| Zr compound calculated as $ZrO_2$ | 5 to 8 | |

I claim:

1. A process of making an enamel having a zirconium-containing opacifying constituent, particularly adapted for application to ceramicware, which comprises first preparing a frit containing about 40% to about 55% of silica, about 4.5% to about 10% of aluminia and about 8% to about 12% of boric anhydride, and about 8% to about 10% of zirconia, the amount of alkali metal compounds in said frit being not substantially above 7.4%, figured as Na₂O, and which frit is at least nearly saturated with zirconia, and thereafter milling this zirconium-containing frit while in the presence of an opacifying agent containing a zirconium compound.

2. A process as claimed in claim 1, in which the frit itself contains from about 40% to about 55% of silica, about 8 to about 12% of boric anhydrid, about 4.5% to about 10% of alumina, and about 8% to about 10% of zirconia.

3. A frit adapted for making an enamel for application to ceramic articles, which frit itself contains
    about 40% to about 55% of silica,
    about 8% to about 10% of boric anhydride,
    about 4.5% to about 10% of alumina, and
    about 8% to about 10% of zirconia.

4. A frit as claimed in claim 3, which also contains about 5% to about 7% of zinc oxide.

5. A frit as claimed in claim 3, and which also contains about 3% to about 4% of fluorides.

6. An enamel obtained from a frit as set forth in claim 3, and which enamel also contains as an opacifying agent, a zironium compound in addition to that contained in the frit.

7. Process for producing an enamelling composition suitable for ceramic ware, which process comprises milling an opacifying agent containing a zirconium compound with a frit containing about 40% to about 55% SiO₂, about 8% to about 12% of B₂O₃, about 4.5% to about 10% Al₂O₃, and about 8% to about 10% of ZrO₂, the alkali metal oxide content of said frit not exceeding 8%.

8. A frit adapted for making an enamel for application to ceramic ware, said frit containing about 40% to about 55% SiO₂, about 8% to about 12% B₂O₃, about 4.5% to about 10% Al₂O₃, and about 8% to about 10% of ZrO₂, the alkali metal oxide content of the frit not exceeding 8%.

9. An enamelling composition suitable for application to ceramic ware, said composition comprising an opacifying agent containing a zirconium compound mixed with a frit containing about 40% to about 55% SiO₂, about 8% to about 12% B₂O₃, about 4.5% to about 10% Al₂O₃ and about 8% to about 10% of ZrO₂, the alkali metal oxide content of the frit not exceeding 8%.

MAXIME PÂQUET.